United States Patent
Boisvert et al.

(10) Patent No.: US 7,383,425 B2
(45) Date of Patent: Jun. 3, 2008

(54) MASSIVELY REDUCED INSTRUCTION SET PROCESSOR

(75) Inventors: Eric Boisvert, Kanata (CA); Alain Rivard, Kanata (CA); George Chamberlain, Kanata (CA)

(73) Assignee: Pleora Technologies Inc., Kanata (CA)

( * ) Notice: Subject to any disclaimer, the term of this patent is extended or adjusted under 35 U.S.C. 154(b) by 780 days.

(21) Appl. No.: 10/787,094

(22) Filed: Feb. 27, 2004

(65) Prior Publication Data

US 2005/0086352 A1    Apr. 21, 2005

(30) Foreign Application Priority Data

Sep. 29, 2003    (CA) ................................... 2443347

(51) Int. Cl.
*G06F 15/00*    (2006.01)

(52) U.S. Cl. ........................ 712/41; 712/208; 712/214; 712/25; 712/200; 712/225; 712/242; 712/243; 370/359; 370/419

(58) Field of Classification Search ................ 709/230, 709/224, 250, 201, 212, 238; 370/359, 419; 712/41, 25, 200, 205, 208, 214, 225, 242, 712/243, 359, 419
See application file for complete search history.

(56) References Cited

U.S. PATENT DOCUMENTS

| 5,655,133 | A * | 8/1997 | Dupree et al. ................. 712/23 |
| 6,092,229 | A * | 7/2000 | Boyle et al. ................. 714/748 |
| 6,434,620 | B1 * | 8/2002 | Boucher et al. ............ 709/230 |
| 6,449,709 | B1 * | 9/2002 | Gates ......................... 712/202 |
| 7,020,836 | B2 * | 3/2006 | Beverly ...................... 714/808 |
| 7,051,189 | B2 * | 5/2006 | Warnes ....................... 712/210 |
| 2003/0048775 | A1 * | 3/2003 | Westermeier ............... 370/352 |

* cited by examiner

*Primary Examiner*—Ricky Q. Ngo
*Assistant Examiner*—Kibrom T Hailu
(74) *Attorney, Agent, or Firm*—Brett J. Slaney; Daphne L. Maravei; Blake, Cassels & Graydon LLP

(57) ABSTRACT

This invention is directed to a method and apparatus for providing low, predictable latencies in processing IP packets. The apparatus provides a specialized microprocessor or hardwired circuitry to process IP packets for video communications and control of the video source without an operating system. The method relates to operation of a microprocessor which is suitably arranged to carry out the steps of the method. The method includes details of operation of the specialized microprocessor.

18 Claims, 8 Drawing Sheets

Figure 5

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 0 | DMR | \multicolumn{13}{l}{Destination Address (DA)} | | | | | DBS | x | x | SMR | \multicolumn{7}{l}{Source Address (SA)} | | | | | | | | SBS |

| DMR | Selects the destination region ('0' for User Memory; '1' for Registers). |
|---|---|
| DA | Destination Address, in word. |
| DBS | The data word is byte swapped when DBS ^ SBS = 1. |
| SMR | Selects the source region ('0' for User Memory; '1' for Registers). |
| SBS | The data word is byte swapped when DBS ^ SBS = 1. |

Figure 6

| 1 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | 1 | DMR | \multicolumn{13}{l}{Destination Address (DA)} | | | | | DBS | \multicolumn{15}{l}{Constant Word (CW)} | | | | | | | | | | | | | | | |

| DMR | Selects the destination region ('0' for User Memory; '1' for Registers). |
|---|---|
| DA | Destination Address, in word. |
| DBS | The data word is byte swapped when SBS = 1. |
| CW | Constant word to be loaded into the destination address. |

Figure 7

| REG_A | General Purpose Register A | |
|---|---|---|
| Access | Read/Write. Auto-Updated. | |
| Bit | Name | Description |
| B[15:0] | A[15:0] | General Purpose Register A. |

Figure 8

| REG_B | General Purpose Register B | |
|---|---|---|
| Access | Read/Write. Auto-Updated. | |
| Bit | Name | Description |
| B[15:0] | B[15:0] | General Purpose Register B. |

Figure 9

| PCNT | Program Counter | |
|---|---|---|
| Access | Write Only. Auto-Updated. | |
| Bit | Name | Description |
| B[15] | IE | If Equal jumping condition. |
| B[14] | IG | If Greater jumping condition. |
| B[13] | IN | If Not jumping condition. |
| B[12] | Reserved | Unused – always write "0". |
| B[11:0] | PCNT[11:0] | Program Counter. On a write, Program Counter is updated with PCNT[11:0] value if the following condition is met:<br><br>case ({IE, IG})<br>2'b00: 1<br>2'b01: IN ^ ((MASK & A) > (MASK & B))<br>2'b10: IN ^ ((MASK & A) == (MASK & B))<br>2'b11: IN ^ (((MASK & A) == (MASK & B)) \|\| ((MASK & A) > (MASK & B))).<br><br>After every program memory fetching, Program Counter is incremented by 1. |

Figure 10

| RETA | Return Register | |
|---|---|---|
| Access | Read Only. Auto-Updated. | |
| Bit | Name | Description |
| B[15:12] | Reserved | Unused. |
| B[11:0] | RETA[11:0] | Return Register. On a write in the Program Counter with IE = 0, IG = 0 and IN = 1, the Return Register is loaded with PCNT[11:0] value. |

Figure 11

| MASK | Mask Register | |
|---|---|---|
| Access | Read/Write. | |
| Bit | Name | Description |
| B[15:0] | MASK[15:0] | Mask register used for some operations like comparison, bit setting and bit clearing. By default this register is set to FFFFh. |

Figure 12

| WAIT | Wait Register | |
|---|---|---|
| Access | Read/Write. Auto-Updated. | |
| Bit | Name | Description |
| B[15] | T1 | Set this bit to one makes the processor waiting for timer 1 reaches zero. If more than one bit is set in the WAIT register, the processor stops waiting on the first event. Read value is one when timer 1 is equal to zero. |
| B[14] | T0 | Set this bit to one makes the processor waiting for timer 0 reaches zero. If more than one bit is set in the WAIT register, the processor stops waiting on the first event. Read value is one when timer 0 is equal to zero. |
| B[13:4] | Reserved | Unused – always write "0". |
| B[3:0] | I[3:0] | Set one bit to one makes the processor waiting for the corresponding interrupt. If more than one bit is set in the WAIT register, the processor stops waiting on the first event. Read this register shows which interrupt occurred and clears I[3:0] bits. |

Figure 13

| TIMER0 | Timer 0 Register | |
|---|---|---|
| Access | Write Only. Auto-Updated. | |
| Bit | Name | Description |
| B[15:0] | TIMER0[15:0] | Timer 0 Register. Write a non-zero value sets and starts the timer. It is decremented on every clock cycle. When it reaches zero, the timer is stopped and T0 bit is set in WAIT register. |

Figure 14

| TIMER1 | Timer 1 Register | |
|---|---|---|
| Access | Write Only. Auto-Updated. | |
| Bit | Name | Description |
| B[15:0] | TIMER1[15:0] | Timer 1 Register. Write a non-zero value sets and starts the timer. It is decremented on every clock cycle. When it reaches zero, the timer is stopped and T1 bit is set in WAIT register. |

Figure 15

| CSUM | CheckSum Adder Register | |
|---|---|---|
| Access | Read/Write. | |
| Bit | Name | Description |
| B[15:0] | CSUM[15:0] | CheckSum Adder Register. On a write, the 16-bit one's complement sum is computed from the previous value and the written value. On a read, the read value is inverted (~CSUM[15:0]) and it is reset to zero. |

Figure 16

| DMA | DMA Register | |
|---|---|---|
| Access | Write Only. Auto-Updated. | |
| Bit | Name | Description |
| B[15:12] | Reserved | Unused – always write "0". |
| B[11:0] | LEN[11:0] | DMA Length Register. Write any value in the LEN field starts a DMA of LEN bytes (4096 if value = 0) from address contained in A[13:0] to address contained in B[13:0]. Bit 13 of each address register indicates if it's from/to register (0) or memory (1). During the DMA, memory addresses are incremented and register addresses are not incremented. |

Figure 17

| PCNT Flags | | | Comparators | | Result | |
|---|---|---|---|---|---|---|
| IE | IG | IN | eq | gt | jump | call |
| 0 | 0 | 0 | X | X | 1 | 0 |
| 0 | 0 | 1 | X | X | 1 | 1 |
| 0 | 1 | IN | X | gt | IN ^ gt | 0 |
| 1 | 0 | IN | eq | x | IN ^ eq | 0 |
| 1 | 1 | IN | eq | gt | IN ^ (eq \| gt) | 0 |

Figure 18

| Macro | Opcode | Arg0 | Arg1 | Description |
|---|---|---|---|---|
| JMP Addr[11:0] | LOAD | K_PCNT_ADR | {4'h0, Addr[11:0]} | Inconditional Jump at Addr[11:0]. |
| JEQ Addr[11:0] | LOAD | K_PCNT_ADR | {4'h8, Addr[11:0]} | Jump at Addr[11:0] if (A & MASK) == (B & MASK). |
| JGT Addr[11:0] | LOAD | K_PCNT_ADR | {4'h4, Addr[11:0]} | Jump at Addr[11:0] if (A & MASK) > (B & MASK). |
| JGE Addr[11:0] | LOAD | K_PCNT_ADR | {4'hC, Addr[11:0]} | Jump at Addr[11:0] if (A & MASK) >= (B & MASK). |
| JNE Addr[11:0] | LOAD | K_PCNT_ADR | {4'hA, Addr[11:0]} | Jump at Addr[11:0] if (A & MASK) != (B & MASK). |
| JLE Addr[11:0] | LOAD | K_PCNT_ADR | {4'h6, Addr[11:0]} | Jump at Addr[11:0] if (A & MASK) <= (B & MASK). |
| JLT Addr[11:0] | LOAD | K_PCNT_ADR | {4'hE, Addr[11:0]} | Jump at Addr[11:0] if (A & MASK) < (B & MASK). |
| CALL Addr[11:0] | LOAD | K_PCNT_ADR | {4'h2, Addr[11:0]} | Inconditional Jump at Addr[11:0] and store PCNT register value in RET register. Used to call a sub-routine and return from it with the RET instruction. |
| RET | MOVE | K_PCNT_ADR | K_RETA_ADR | Inconditional Jump at address stored previously in RETA register. Used to return from a sub-routine CALL instruction. |

MASSIVELY REDUCED INSTRUCTION SET PROCESSOR

FIELD OF INVENTION

This invention relates in general to microprocessors, and in particular, to a microprocessor used for data communications.

BACKGROUND OF THE INVENTION

Over the last few decades Internet Protocol (IP) communications have become the dominant form of electronic communication. IP communications allow the use of a wide array of different protocols. To simplify data handling and routing, the protocols are arranged in a stack and the "lowest-level" protocols encapsulate the higher-level protocols. This encapsulation allows the idiosyncrasies of the higher level protocols to be hidden from the routing functions and further allows the partitioning of the analysis of the data.

In stand-alone devices, also known as embedded products and embedded devices, embedded computers are typically used to perform the encapsulation and de-encapsulation to send and receive the data respectively. An embedded computer is characterized as having a general purpose CPU, with associated memory. The computer runs an Operating System (OS), such as embedded Linux. The protocol processing is handled by the OS and application software is provided that runs on top of the OS to handle the communications functions and other tasks that are required.

This architecture is analogous to what is provided on general purpose computers (PCs) and workstations. Using the same processes to handle the communications in the embedded device as are used on general purpose computers is natural since IP communications was first performed only on general purpose computers and later migrated to embedded devices.

However, different from general purpose computers, embedded devices only have limited resources and are highly cost sensitive. The processor that can be employed in an embedded computer is often very limited in performance due to cost, space, and power consumption constraints. As a result an embedded device often cannot be cost effectively IP enabled for high-bandwidth devices.

To handle multiple tasks a real-time operating system (RTOS) is often employed which provides the abilities to respond to system requests in a very short period of time. Even with this, applications such as high performance image delivery for machine vision find the level of latency and the variation in the latency associated with the delivery of the video to be unacceptable. Further, when OS-based embedded devices are pushed to their limits they can become unreliable with deadlocks that freeze the device.

It is obvious that the above implementations do not address the requirements for protocol processing on a device, such as a high-speed electronic video camera or other high-bandwidth device. Therefore there is a need for a method and apparatus capable of processing IP packets with low, consistent latencies that are suitable for delivering video over an IP network.

SUMMARY OF THE INVENTION

This invention is directed to a method and apparatus for providing low, predictable latencies in processing IP packets. The apparatus provides a specialized microprocessor or hardwired circuitry to process IP packets for video communications and control of the video source without an operating system. The method relates to operation of a microprocessor which is suitably arranged to carry out the steps of the method. The method includes details of operation of the specialized microprocessor.

In accordance with one aspect of this invention, a massively reduced instruction set processor (mRISP) is disclosed which is a tiny embedded soft processor tailored for processing communication protocols in accordance with the method disclosed herein. In a preferred embodiment, this processor has only two instructions and some optional registers performing basic functions, such as arithmetic and logical functions, and specialized functions like Program Counter, Timers, IP Checksum and DMA (Direct Memory Access). The soft implementation of the mRISP is realized since it is fully configurable upon construction through synthesis of a register transfer level (RTL) representation of the design by specifying the registers and the features required in the implementation. The processor that is created from the synthesis is tailored for a specialized task, such as data communications.

The two mRISP instructions are LOAD and MOVE which are the minimal instructions necessary for a processor. Some macros are built over these two instructions in conjunction with registers to add some other basic functionality like JMP, CALL and RET. The macros are used in the compiler for the instruction set for the mRISP, and are built solely using the LOAD and MOVE instructions.

The core is maximally optimized for a 16-bit data bus and a 32-bit instructions bus, although it can be configured for wider or narrower bus widths. In 16-bit data mode, bytes can be swapped for single byte access and operation. The 32-bit instructions bus, separated from the data bus, allows the timing to be reduced to only one clock cycle for a LOAD and two clock cycles for a MOVE. An extra clock cycle is added to the timing on a jump in the program counter.

For slow external memory fetching or for any other specific reasons, external logic can be added to control the HOLD input signal and holds the processor for a required number of clock cycles. In addition to that, specialized waiting functions, if required and activated, can hold the processor until an expected event occurs.

With such a processor, IP packets can be processed at significantly higher rates, with lower, consistent latencies, than can be accomplished using a general purpose microprocessor.

BRIEF DESCRIPTION OF THE DRAWINGS

FIG. 5 is a layout of a MOVE instruction.

FIG. 6 is a layout a LOAD instruction.

FIG. 7 is a field layout and description of a general purpose register, REG_A.

FIG. 8 is a field layout and description of a second general purpose register, REG_B.

FIG. 9 is a field layout and description of a program counter register, PCNT.

FIG. 10 is a field layout and description of a return register, RETA.

FIG. 11 is a field layout and description of a mask register, MASK.

FIG. 12 is a field layout and description of a wait register, WAIT.

FIG. 13 is a field layout and description of a timer register, TIMER0.

FIG. 14 is a field layout and description of another timer register, TIMER1.

FIG. 15 is a field layout and description of a checksum register, CSUM.

FIG. 16 is a field layout and description of a direct memory address register, DMA.

FIG. 17 is a table listing jump and call conditions when writing in the Program Counter.

FIG. 18 is a list of a possible set of macros that could be used to implement jump and call directives in a two op code microprocessor constructed in accordance with the principles of the invention.

DETAILED DESCRIPTION OF THE PREFERRED EMBODIMENT

In the following detailed description of the embodiments, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions as defined in the claims appended hereto. The following detailed description is, therefore, not to be taken in a limiting sense, and the scope of the present inventions is defined only by the appended claims.

Figure 1:
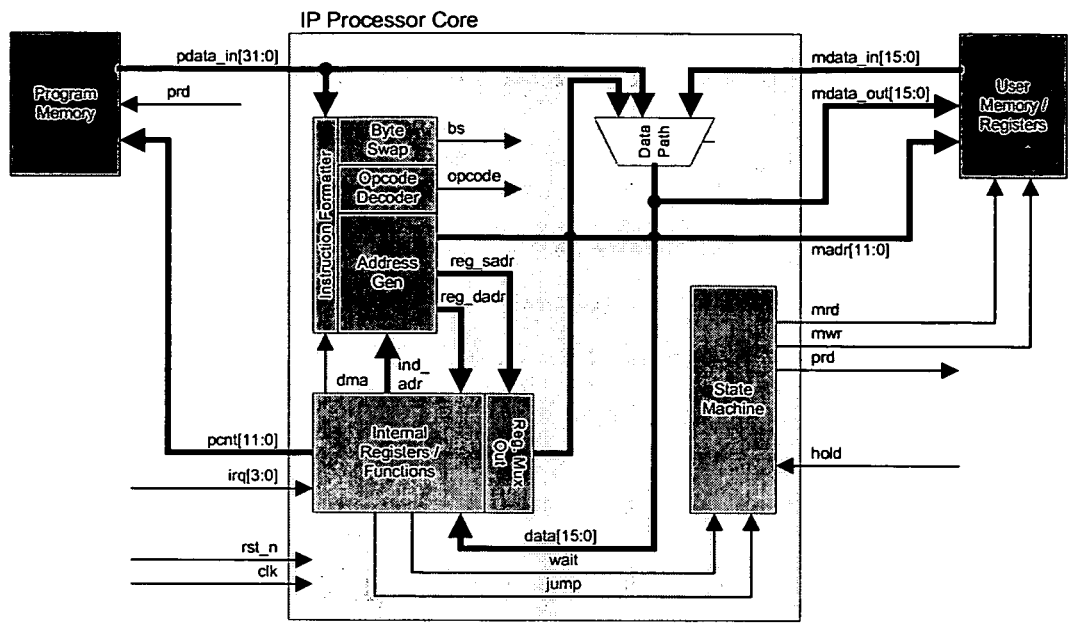
FIG. 1 is a functional block diagram of a microprocessor constructed in accordance with the preferred embodiment of the invention.
Figure 20:
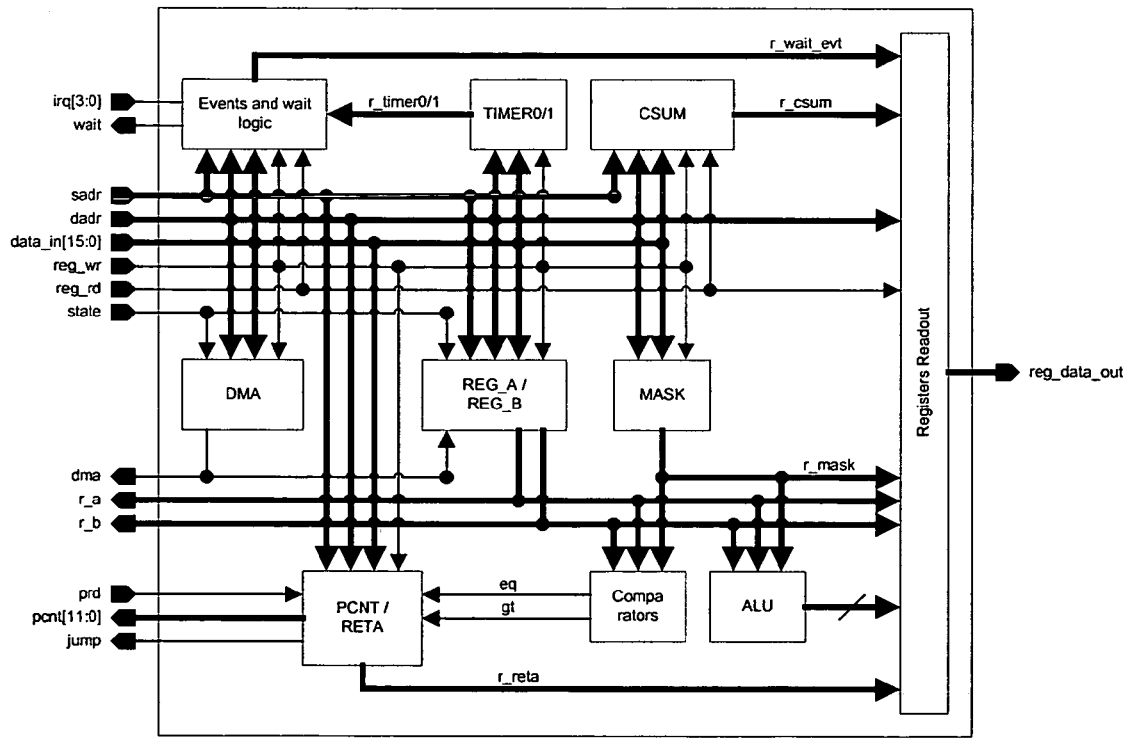
FIG. 20 is a functional block diagram of a preferred embodiment of the Internal Registers and Functions elements of FIG. 1.

FIGS. 1 and 20 depict a preferred embodiment of the massively reduced instruction set processor (mRISP) constructed in accordance with the principles of the invention. The mRISP implements the CPU with separate data and program memory bus, generally known as a Harvard memory architecture. Preferably, the mRISP program memory bus is a 32-bit wide bus that is used to fetch instructions from memory. The mRISP data bus is preferably a 16-bit wide bus that is used to move 16-bit word data from user memory, internal registers or program memory to user memory and internal registers. The external user memory bus may be connected to memories or peripherals. It is through these connections that communication and control data is transferred to and from the mRISP for processing and analysis.

For example, in a camera capable of high-speed IP communications, the video data will be placed in user memory through an external controller. The mRISP can be signalled via irq[3:0] signals, as depicted in FIG. 1, to prepare the IP headers for communications and finalize the packet. Similarly, once the packet is finalized, a write in a dedicated peripheral port (which can be a register) is used to signal the communications interface to send the data. The inverse of this method is used when receiving a packet. The external controller fills the user memory with the incoming packet and signals the mRISP through irq[3:0] signals. Then the mRISP processes the packet in its user memory and take the appropriate action depending on the contents of the packet. Control and configuration information is transferred in an identical manner.

Instruction Set

The mRISP instruction set is massively reduced to only two instructions. The first one is the instruction MOVE which one moves data from a source address to a destination address. The only other instruction necessary for a functional CPU is the instruction LOAD, which one can initialize memory and registers to a proper value from the program memory.

Therefore, in the preferred implementation each 32-bit instruction contains only one bit to encode the opcode. On an instruction MOVE, 14-bits are dedicated for the source address and another 14-bits are used for the destination address, leaving 3 bits unused. On an instruction LOAD, 14-bits are used for the destination address and 16-bits for the constant word to load, leaving 1 bit unused.

The most significant bit (MSB) bit of the addresses (source and destination) is used to select between the external user memory region and the internal registers region. The least significant bit (LSB) bit of the addresses (source and destination) is used to decode if data bytes swapping has to be done. Thus 12 bits out of 14 bits are available to user memory and peripheral. The external memory address is in word (16-bit).

FIGS. 5 and 6 provide layout giving a bit by bit description of the MOVE and LOAD instructions.

Figure 19:
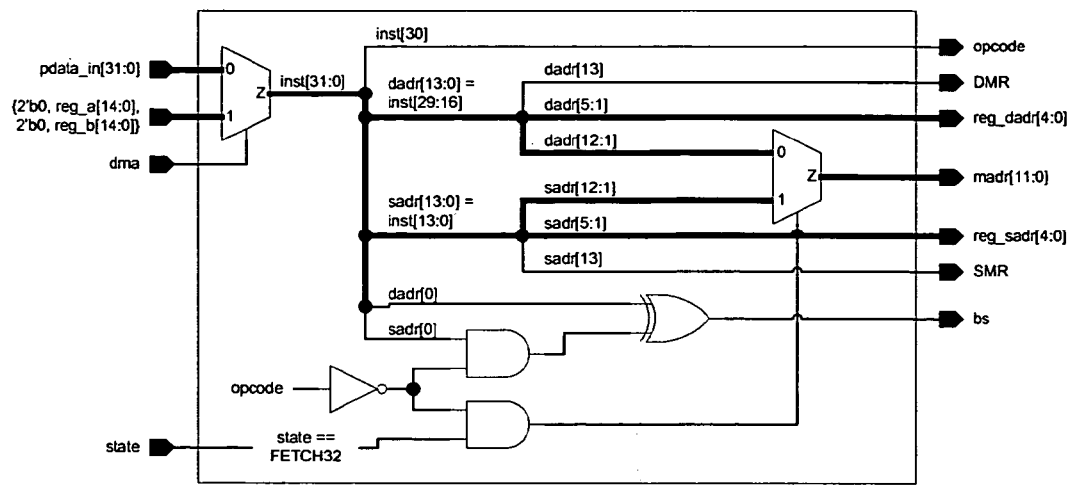
FIG. 19 is a functional block diagram of a preferred implementation of the instruction formatter with the opcode decoder elements of FIG. 1 that include an address detector and a byte swapping detector.

FIG. 19 provides an implementation of the instruction formatter with the opcode decoder, address detector and byte swapping detector.

Internal Registers and Functions

Preferably, the mRISP has two general-purpose registers (REG_A and REG_B), the layout of which are shown in FIGS. 7 and 8. The mRISP preferably also has some dedicated registers performing specific functions (i.e. features). Those functions may be any combination or number of arithmetic (increment, adder), logical (AND, OR, XOR), comparators, timers see FIG. 14, DMA see FIG. 16, interrupts as shown in FIG. 10 and program counter as shown in FIG. 9 functions. The arithmetic and logical registers use the general-purpose registers with the mask register as shown in FIG. 11 as inputs. Their values are constantly updated as general-purpose registers change.

Figure 4:
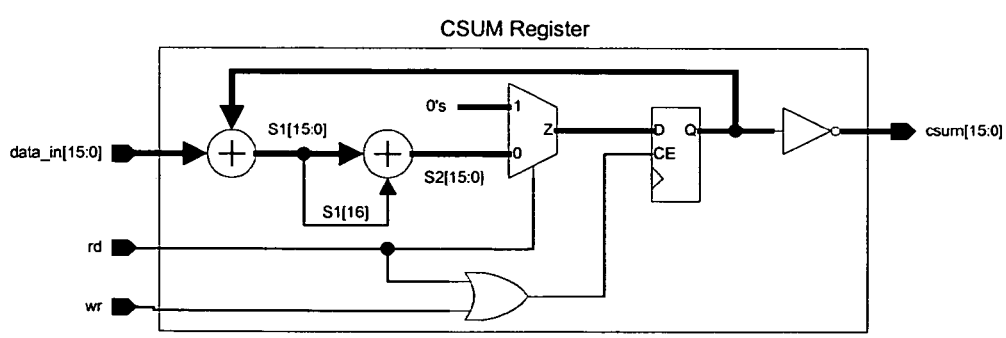
FIG. 4 is a functional block diagram of an embodiment a CSUM checksum register.

Two registers are specifically designed to process Internet Protocols. The first one (CSUM) which is shown in FIG. 4 and FIG. 15. The CSUM register is useful to compute Internet Protocols checksums. The method used to compute the IP checksum is the 16-bit one's complement sum of the corresponding data. Each time a write is done into the CSUM register, the 16-bit one's complement addition is computed from the previous value and the written value. When all the data to be included in the checksum has been written in this register, the read of this register gives the 16-bit one's complement sum by inverting the present value. A read resets the CSUM register to zero, ready for another computation. By filling the checksum field(s) in the IP header(s) with a magic number, the checksum can be serially performed as the data is being packetized. One word is added at the end of the packet with the appropriate data necessary to make the magic number in the header field correct.

The second register is the DMA register which is shown in FIG. 16. The (DMA) register is used to move multiple data from one location to another one within three instructions. When one location is an internal register, its address is not incremented, enabling the capability to send consecutive data in memory into one special register or initialize consecutive data in memory with one register's value. In conjunction with the CSUM register, the DMA register is used to quickly and easily compute Internet Protocols checksums with only a few instructions.

Comparisons between REG_A and REG_B are constantly computed. Two flags are necessary to denote all possible comparison outcomes, namely, equal '==', not equal '!=', less than '<', greater than '>', less than or equal '<=' and greater than or equal '>='. The first flag of the two flags is the "A Equal B" flag (eq) and the second one is the "A Greater than B" flag (gt). Those flags are used in conjunction with the Program Counter (PCNT) to enable conditional jumps. The descriptions of the General Purpose registers, Program Counter, Return Register, Mask Register, Wait Register, Timer 0 Register, Timer 1 Register, Checksum Register and DMA Register are provided in FIGS. 7-15 respectively.

FIG. 20 is a functional block diagram of a preferred embodiment of the Internal Registers and Functions elements of FIG. 1. FIG. 20 shows the interoperation of the Internal Registers and Functions.

Program Counter and Return Registers

The Program Counter register (PCNT) is cleared to zero on reset and is incremented by one on the last cycle of every instruction (when prd, see FIG. 1, is high). The PCNT always points to the next instruction during the processing of the current instruction. A jump in the program memory can be accomplished by writing the new instruction's address in the Program Counter register. The jump can be conditional or not, depending on the state of the comparator flags (eq and gt) and the setting of the three flag bits (IE, IG and IN) in the Program Counter Register.

FIG. 17 summarizes the jump and the call conditions when writing in the Program Counter.

A CALL instruction can be accomplished by writing in the Program Counter register the sub-routine's address and by setting the flags to IE=0, IG=0 and IN=1. In this case, the Return register (RETA) loads the Program Counter's value at the same time the jump is done. Later, on a RET instruction (by moving RETA's value into PCNT register), the mRISP can resume fetching instructions on the next one's after the CALL instruction. The stack is hardware and its depth is configurable at the synthesis. The stack is structured as a LIFO (Last In First Out). On a CALL instruction, the Program Counter's value is pushed in the LIFO and on a RET instruction, the value to write into the Program Counter is pulled from the LIFO.

Event Handling

In the preferred implementation the mRISP allows up to 16 events, which can be generated from any of the two sources: external hardware interrupts or internal events. The internal events may come from timers, real-time timer and watchdog logic. All events are completely handled by software (or firmware) and no event can interrupt the execution of the program. The software must verify itself in the WAIT register if an event occurred. The software can put the processor in the sleep mode by setting in the WAIT register the bit(s) of the corresponding event(s) it want to be waked up.

Figure 21:
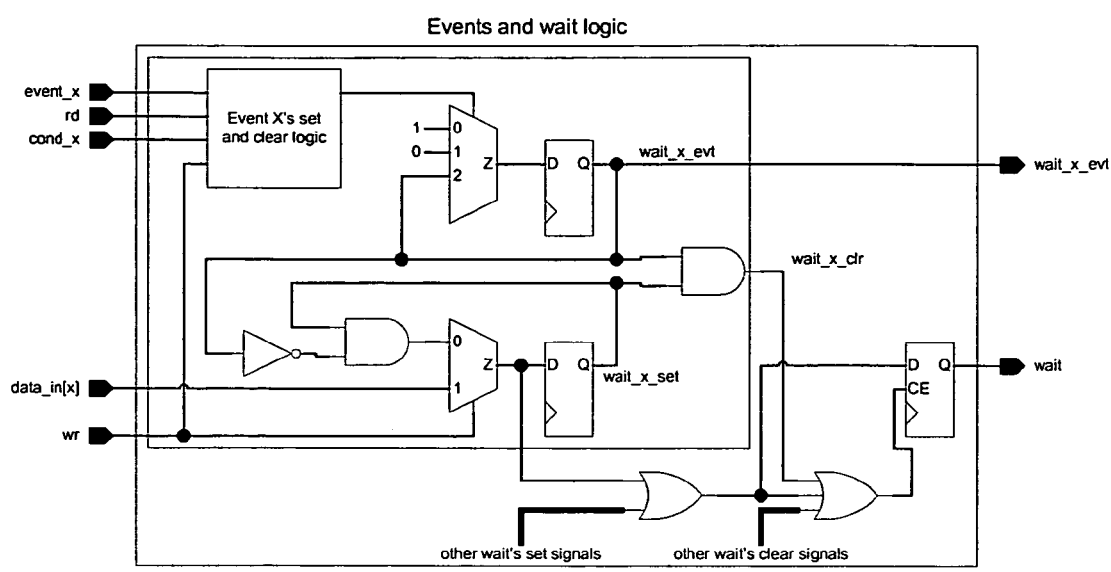
FIG. 21 is a functional block diagram of a preferred implementation of the Event Block element of FIG. 20.

According to FIG. 12 and FIG. 21, writing one in the event 'X' bit of the WAIT register, sets to one the corresponding "SET" signal (wait_x_set) and, at the same time, sets to one the global signal wait. Then the processor goes in the sleep mode and waits for the event X.

When this event occurs (event_x goes to one), the corresponding "EVENT" signal (wait_x_evt) is set to one. One clock cycle later, this signal clears the SET signal (wait_x_set) and the global signal wait. Thus the processor resumes its operations.

The software has the responsibility to clear the EVENT bit and to retrieve which event waked up the processor if more than one bit has been set in the wait register. By reading the WAIT register, the software reads all the EVENT bits (wait_?_evt) and also clears most of the bits (timer event bits are only clear by writing in the corresponding TIMER register).

FIG. 21 provides an implementation of the Event Block.

Macros

Macros are added to instructions that are interpreted by the compiler. These make the mRISP easier to program and makes the resulting assembly code more understandable and maintainable. These are built over the two instructions in conjunction with registers. For example the JMP macro, which one is used to jump in another part of the program, is in fact a LOAD instruction with the destination address equals to the Program Counter register's address and the constant data equals to the address to jump in the program memory.

FIG. 18 provides a listing of a possible set of macros that could be used.

Data Path

For each instruction, a 16-bit data word is transferred from one location to another one. The source may be from the program memory (on a LOAD), from one of the internal registers or from the user memory (on a MOVE). The destination may be either one of the internal registers or the user memory.

The higher byte and the lower byte in the data may be swapped together when only one of the location address is odd (bit 0 is high). This is very useful to reverse the byte ordering since Internet Protocols are big-endian and the mRISP is little-endian.

Figure 3:
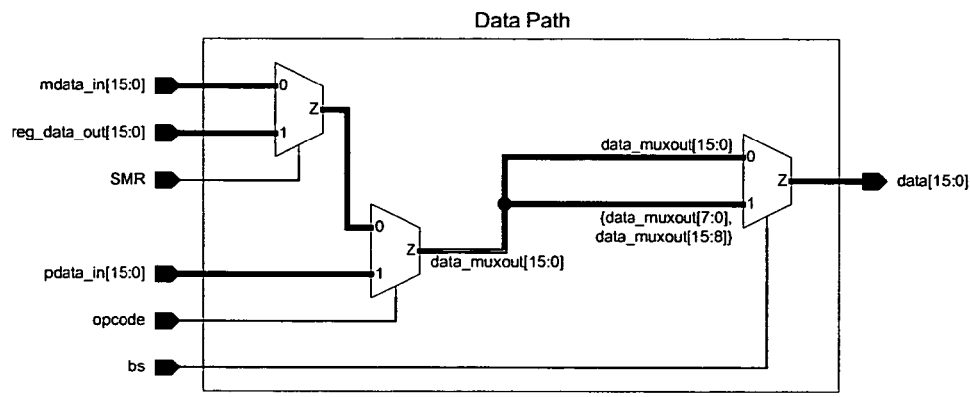
FIG. 3 is a functional block diagram of the Data Path of the User Memory/registers portion of FIG. 1.

FIG. 3 is a functional block diagram of the data path used by the microprocessor of the present invention.

State Machine

The mRISP state machine synchronizes internal and external control signals to provide efficient timing. The LOAD instruction takes only one clock cycle and two clock cycles are taken to execute the MOVE instruction. An extra clock cycle is added to the timing on a jump in the program counter.

Figure 2:
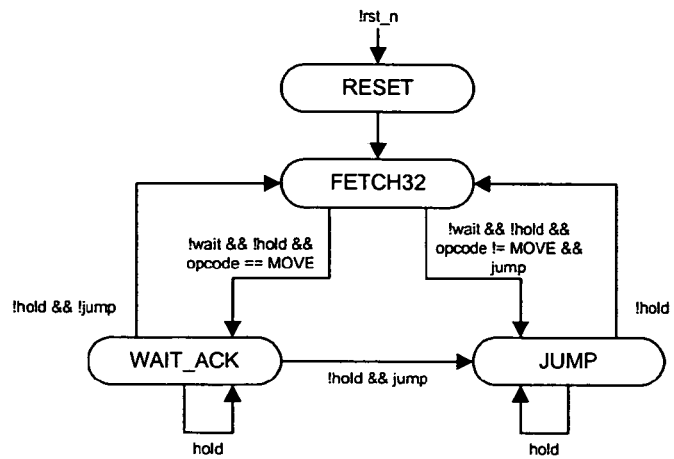
FIG. 2 is a state diagram of the mRISP State Machine element of the microprocessor of FIG. 1.

FIG. 2 provides a state diagram of the mRISP State Machine portion of FIG. 1. A mRISP constructed in accordance with the present invention, has only four states RESET, FETCH32, WAIT_ACK and JUMP. The RESET state is reached whenever the signal rst_n is asserted on the so named signal line shown in FIG. 1. At the first cycle where rst_n is de-asserted, the state machine goes to the FETCH32 state.

The FETCH32 state decodes the instruction presented on the pdata_in bus. Depending on the value of the opcode and the signals hold and wait on the so named signal lines shown in FIG. 1, the next state can be WAIT_ACK, JUMP or FETCH32 again. The signal wait is used in this state to keep the processor waiting for an event, defined previously by writing in the WAIT register. During this waiting, no instruction fetching, no writes and no reads are performed. In the FETCH32 state, the signal hold has the same effect as the signal wait but it is generated by external logic. The reason for its assertion may be that data from the program memory is not ready due to slow memory, that the write from the previous instruction into external memories takes more than one clock cycle or for any other reasons. If the signals wait and hold are not asserted and the opcode is MOVE, a read is performed from the source address and the next state is WAIT_ACK. Otherwise the instruction LOAD is performed. The constant data contained in the instruction is written to the destination address. If the destination address is the Program Counter Register (PCNT) and the flag indicates an unconditional jump or a true conditional jump (signal jump is asserted), the State Machine goes in the JUMP state. Otherwise, it stays in the same state, ready for the next instruction.

The WAIT_ACK state waits for the read data from the source address to be ready. If it's not, the external logic must keep the signal hold asserted until data is ready. When it is ready, the State Machine comes back in the FETCH32 state unless the destination address of the MOVE instruction was the Program Counter Register (PCNT) and the flag indicated an unconditional jump or a true conditional jump (signal jump is asserted). In this last case, the next state is going to be JUMP.

The JUMP state is an idle state where the cycle is used only to fetch the instruction pointed by the new address loaded in the Program Counter Register. The State Machine comes back in the FECTH32 state unless the external logic keeps the signal hold asserted for any reason.

One skilled in the art will recognize that this description provides a very lean implementation of a processor optimized for handling the delivering data from one location to another. Through this lean implementation data can be moved very quickly and efficiently providing for high efficiency and low latency in data transfer.

Through the software for the mRISP, IP packets can be generated and moved with the associated data payload. Since the processor provides a single thread of processing, and the use of an operating system is not required, latencies are predictable. It will be noted that an operating system is undesirable since the mRISP is best suited to perform a single function, such as IP packet processing, and an operating system would increase the latency and reduce the predictability of the system.

It is to be understood that this description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The embodiment(s) of the invention described above is (are) intended to be exemplary only. The scope of the invention is therefore intended to be limited solely by the scope of the appended claims.

We claim:

1. An apparatus providing a specialized microprocessor or hardwired circuitry to process packets for data communications and control comprising:
a) a microprocessor in communication with a memory for data and program storage, the processor configured to process instruction words of a fixed length of bits and to decode only two instructions, a MOVE instruction for moving data from a source address to a destination address and a LOAD instruction for initializing values;
b) two general-purpose registers in communication with the microprocessor; and
c) a state machine controlling the operation of the microprocessor, the state machine consisting of only four states, a RESET state, a FETCH state, a WAIT state and a JUMP state.

2. The apparatus of claim 1 further including:
a) means to handle internal events coupled to said microprocessor; and
b) means to handle external events coupled to said microprocessor.

3. The apparatus of claim 1 further including a direct memory access (DMA) register coupled to said microprocessor.

4. The apparatus of claim 3 further including at least one timer coupled to said microprocessor.

5. The apparatus of claim 1 wherein the packets are Internet protocol packets.

6. The apparatus of claim 2 wherein the means to handle internal events is responsive to events originating from at least one of:
a) timers;
b) real-time timers; or
c) watchdog logic.

7. The apparatus of claim 2 wherein the means to handle external events is responsive to events originating from:
a) the reception of a packet;
b) notification that data is ready to be transmitted; or
c) notification that data has been transmitted.

8. The apparatus of claim 7 wherein the packets contain video information.

9. The apparatus of claim 1 further including a checksum (CSUM) register and a DMA register coupled to said microprocessor.

10. The apparatus of claim 1 further including a comparator coupled to both said general-purpose registers to produce an output to the microprocessor representative of the relative data content between the two registers.

11. The apparatus of claim 10 wherein the comparator output is a pair of flags, namely, an equal flag and a greater than flag.

12. The apparatus of claim 1 further including a CSUM register coupled to the microprocessor over a data path, the CSUM register configured to calculate a one's complement of each instruction word received over the data path.

13. The apparatus of claim 12 that calculates a checksum value that matches a pre-chosen value.

14. The apparatus of claim 1 wherein the MOVE instruction has 14 bits dedicated to define a source address and 14 bits dedicated to define a destination address.

15. The apparatus of claim 1 further including the following means, each coupled to said microprocessor:
   a) means to handle internal events;
   b) means to handle external events;
   c) a DMA register;
   d) a CSUM register; and
   e) at least one timer.

16. The apparatus of claim 15 wherein the packets are Internet protocol packets.

17. The apparatus of claim 16 wherein the packets contain video information.

18. The apparatus of claim 17 wherein the means to handle external events is responsive to:
   a) the reception of a packet;
   b) notification that data is ready to be transmitted; or
   c) notification that data has been transmitted.

* * * * *